2,990,027
COMPOSITE SOUND ABSORBER
Hale J. Sabine, Glen Ellyn, Ill., assignor to The Celotex Corporation, Chicago, Ill., a corporation of Delaware
Filed July 11, 1957, Ser. No. 671,305
5 Claims. (Cl. 181—33)

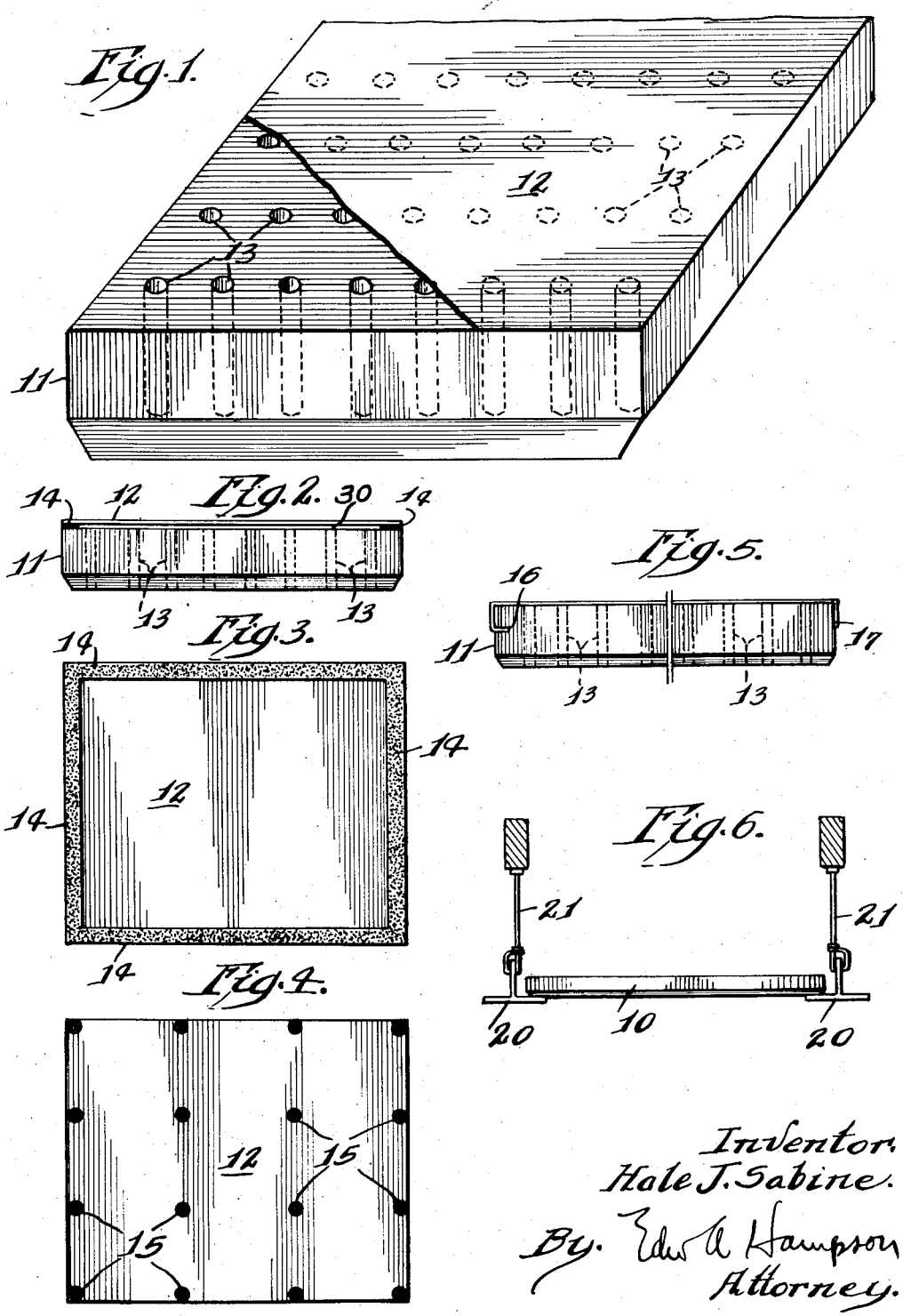

The inventions hereof are in connection with the absorption of sound for the purposes of acoustical correction. By and large, acoustical correction products available on the market are relatively heavy and fragile. This is not to say that all such products are heavy. In fact few, if any, are sufficiently heavy to require massive supports, but nevertheless many are sufficiently heavy as to require quite strong and rigid supporting constructions to properly support a ceiling comprised of such. Many of these products are comprised of fiberboard or cementitious compositions et cetera, which are rather susceptible to damage in shipment and installation.

Basically, it is the object of this invention to provide a sound absorbing construction as a composite element which, in a preferred form thereof, is of extremely light weight per unit area and which can be mounted and supported on very simple and extremely light weight supporting members.

Other objects of the inventions are the provision of such an acoustical correction element which is simple to manufacture, which is susceptible to numerous forms incorporating the inventions hereof, and yet a product which has satisfactory and in fact relatively high sound absorption.

The inventions hereof are disclosed in the accompanying drawings, in connection with which it is to be understood that the figures of the drawing are diagrammatic or schematic and are not drawn to scale, various portions of the drawing being definitely out of scale for the purpose of illustration only.

In the drawings,

FIGURE 1 is a bird's-eye perspective of an element or unit;

FIGURE 2 is an edge plan view of the unit on a reduced scale and showing an embodiment utilizing an edge glue line;

FIGURE 3 is a bottom plan view of the embodiment of FIGURE 2 with the face portion omitted;

FIGURE 4 is a bottom plan view of the embodiment of FIGURE 2 with the face portion omitted and showing an alternative method of placement of adhesive;

FIGURE 5 is an edge plan view of the unit on a reduced scale and showing an embodiment illustrating alternative means for securing the elements of the unit together; and FIGURE 6 is diagrammatic view of the element of FIGURE 1, as installed in preferred usage.

The sound absorbing element hereof is a composite structure. The composite sound absorbing element is comprised of a face portion 11 and a rear portion 12. Purely for the purpose of illustration, portion 11 is merely illustrative, and it is to be understood that the face portion 11 may be of a thickness substantially entirely dependent upon the material of which it is composed. Face portion 11 may be comprised of so-called rigid vinyl film of a thickness of about 0.015-inch, or it may be comprised of hardboard of conventional thickness, or of an asbestos-cement sheet or fiberboard. The thickness of face portion 11 while it does have a slight effect on the sound absorption of the composited unit, the relative effect is small, and it is on such basis that the statement is made to the effect that the thickness has little effect on the over-all sound absorption.

Face portion 11 is shown as having applied to the rear surface thereof a thin sheet 12, the thickness of which is of considerable importance in obtaining the desired sound absorbing effect. Preferably, sheet 12 is a Mylar film of polyvinyl resin of a thickness of about 0.005-inch. Other substantially physically similar thin films may be employed instead, as, for example, a thin aluminum foil, thin paper, a thin film of synthetic rubber, or the like. In any case, this film must be a substantially air impervious thin film of the order of the thickness of the Mylar film referred to, but so far as is known the thickness should be between approximately 0.00025 and 0.001-inch. The Mylar film referred to has a weight of approximately 0.002 gram per square centimeter, and it follows that the film employed should be of the weight of such order which, of course, will be dependent upon the specific gravity of the material of the film and will vary according to the thickness thereof.

The face sheet 11 is provided with a pattern of perforations which is shown as a square and uniformly spaced pattern of $3/16''$ diameter, perforations $17/32''$ on centers. The open area of the perforations amounts to approximately 11% of the area of the face. The perforations are not necessarily limited to the exact dimensions just stated and may, for example, be $3/32''$ perforations spaced $1/2$ inch on centers, which again provides approximately 11% open area. It is not essential that the exact size of perforation or spacing referred to be observed, but the dimensions should be of the order of those specifically given to provide about 11% open area of the sheet. While the perforations are shown as in a regular pattern, they may be in a somewhat irregular arrangement, but it should be observed that the over-all pattern should comprise a balanced pattern to afford in any section thereof a substantially equal and reasonably uniform communication from one side of the sheet to the other.

The sheets 11 and 12 are secured one to the other as is diagrammatically indicated in FIGURES 2, 3, and 4, that is, sheets 11 and 12 may be composited and maintained in assembled relation by an edge glue line 14, such as is apparent in FIGURES 2 and 3. It is to be understood, of course, that the glue line, as illustrated in the figures, is greatly exaggerated for the purpose of illustration, but that actually a narrow glue line of no substantial thickness will adhere sheet 12 to sheet 11, so that the sheet of itself is in surface contact with the rear face of sheet 11. As alternative to adhering the sheets 11 and 12 by edge-gluing, they may be adhered by spot gluing, such as illustrated in FIGURE 4, in which case the size of the glue spots is exaggerated. The spot gluing for adhering the sheets should be small spots of glue, merely sufficient to adhere the sheets, and should be applied only in sufficient number to assure adherence of sheet 12 to sheet 11, and preferably would provide approximately the number of points of adherence as indicated in the drawing. In any case, if the sheets are spotted at more points than those illustrated, it is essential that they be sufficiently few in number so that the substantial areas between the spots of glue be free so that sheet 12 may freely vibrate between the points of adherence. In referring to spot-gluing, this is, of course, not limited to an actual, somewhat round spot of adhesive, but such can comprise short lines or dashes of adhesive but in connection with which the same precaution must be observed, that is, that there are sufficiently few points of adherence and that they are spaced such that substantially the entire area of sheet 12 may vibrate in those areas between the glue spots or glue lines.

As alternative to the edge or spot gluing, as referred to, sheet 12 may be secured in either of these two ways, shown in FIGURE 5. Sheet 12 may be folded over the edge of face sheet 11, if it is of sufficient thickness to provide therefor, with the peripheral edge of sheet 12 tucked into or wedged in a narrow slot 16 provided in the edge of sheet 11. Also, as a further alternative, the edge of sheet 12 may be folded over the edge of sheet 11 and glued, as at 17, or, if the sheet is somewhat elastic, as, for example, made of a suitable synthetic rubber, it may be so formed that by stretching it slightly its edges may extend down on the side walls of sheet 11 and be retained in place due to the elasticity of the sheet.

In the utilization of the composite, as above described, for absorption of sound, it is essential that sheet 12 may vibrate under the impact of sound waves thereon and, consequently, in installing the sound absorbing material, it should be spaced from the surface to which it is related. In this connection the composited product 10, as illustrated in FIGURE 6, may be mounted with its edges supported on inverted T runnner members 20 supported from a wall or the like by hanger members 21. It is preferred that the back surface of element 10 be spaced at least two inches from any wall surface with which it is associated, but preferably spaced a greater distance, with in general the best spacing being that of between about eight and twelve inches, since at some point between these limits the element is usually most efficient in absorbing sound. Above twelve inches the curve of absorption flattens out so that there is no advantage in spacing the element more than about twelve inches.

The action of the composited element in absorbing sound is that sound waves striking the face of portion 11 pass through the perforations 13 as a series of alternating pulsations resulting in alternate conditions of pressure and rarefaction being transmitted to cause vibration of the thin film 12. For most materials which may be used for face portion 11, the particular material of the sheet and the thickness have little effect on the over-all efficiency of the composited element, since the friction effect of the walls of the perforations and the spring effect of the air contained in the perforations is relatively slight, and particularly so where the face sheet, for example, is a relatively thin sheet of vinyl plastic. Of course, if the face sheet is, say, a one-half inch thick fiberboard then depending upon the density of the sheet it may contribute somewhat to the over-all absorption efficiency, but this is merely incidental and does not have any particular bearing on the inventions hereof.

If an element 10, comprised of a vinyl face sheet 11, 0.015-inch thick with an adhered rear film 12 of Mylar .0005-inch thick, is mounted as illustrated in FIGURE 6, the absorption action is achieved due to the effect of the sound wave pulsations passing through perforations 13 and causing vibration of rear sheet 12. This vibration of rear sheet 12, of course, dissipates energy of the impinging sound waves, but the primary absorption effect is obtained due to the extremely narrow or thin slit-form passages 30 (FIGURE 2) which result between the contiguous faces of sheets 11 and 12 and resulting due to the vibration of sheet 12. As a pressure pulse acts on the inner face of sheet 12 it moves away slightly from sheet 11 and forms a long, thin slit 30 about the periphery at the inner ends of perforations 13. The sound waves or pressure pulse thereof may then spread out from perforations 13 through such thin slit 30. The following rarefaction pulse then allows sheet 12 to return toward or to its original position, consequently narrowing such thin slit 30 extending outwardly between the surfaces around the rear end of a perforation. This action as described, of course, occurs extremely rapidly, for example, through the general range of annoying sounds at from about 16 cycles per second to 12,000 cycles per second, and accordingly it will be readily understood that the flow of sound waves or pulsations through perforations 13 and into and from the narrow slits 30 resulting between the contiguous faces of sheets 11 and 12 will dissipate a large portion of the energy of such sound waves, and thus provide the requisite sound absorption for the element hereof mounted in the manner previously described.

For an absorbing element of the nature of that just above particularly referred to, N.R.C. values of 60 to 70% have been obtained. The elements of which the unit is comprised may be translucent so that the illuminating source can be positioned behind the sound absorbing installation, that is, between the acoustical correction ceiling and the structural ceiling, and such a unit is of very light weight so that it may be mounted and supported on very simple and light weight supporting members.

The inventions hereof having been disclosed in detail, I claim:

1. An acoustical correction element adapted to be spacedly attached to a supporting surface, said element being of composited construction and comprising a rigid face sheet portion, perforated through its thickness by a distributed pattern of perforations, and an air impervious vibratile second sheet portion, means mounting the second sheet portion at spaced intervals to the face sheet portion and so mounted that the second sheet portion is free to vibrate over substantially its entire area independently of the face sheet portion.

2. An acoustical correction element adapted to be spacedly attached to a supporting surface, said element being of composited construction and comprising a rigid face sheet portion, perforated through its thickness by a distributed pattern of perforations, and a second substantially air-impermeable vibratile sheet portion, means mounting the second sheet portion at its peripheral portion folded over the side edges of the face sheet portion and secured thereto whereby the contiguous faces of the sheets are in contact, the entire area of the second sheet portion overlying the face sheet portion and independently vibratable relative the face sheet portion.

3. An acoustical correction element adapted to be spacedly attached to a supporting surface, said element comprising a rigid face sheet of thickness of between about 0.015 to one-half inch thick, such sheet perforated with through passageways of area equal to the area of circles of diameter of between about 3/32 and 3/16-inch spaced about 1/2 to 7/16-inch center to center and the open area comprising about 11% of the area of the sheet, a thin air impervious and readily vibratable sheet of a thickness of between about 0.00025 to 0.0005-inch and means mounting said thin sheet at its periphery to the face sheet and so mounted that the second sheet portion is free to vibrate over substantially its entire area independently of the face sheet portion.

4. An acoustical correction element adapted to be spacedly attached to a supporting surface comprising a rigid face sheet of thickness of between about 0.015 to one-half inch thick, such sheet perforated with through passages of area equal to the area of circles of diameter of between about 3/32 and 3/16-inch, the such perforations dispersed in substantially regular arrangement, spaced about 1/2 to 7/16-inch center to center and the open area comprising about 11% of the area of the sheet, a thin substantially air-impermeable readily vibratable sheet of a thickness of between about 0.00025 to 0.0005-inch, means mounting the vibratable sheet at spaced intervals to the face sheet and so mounted that the vibratable sheet is free to vibrate over substantially its entire area independently of the face sheet portion.

5. A sound absorbing construction comprising in combination a wall surface, sound absorbing elements, and means mounting and supporting the sound absorbing elements relative the wall surface and spaced at least two inches therefrom, the sound absorbing elements comprising a perforated rigid face portion and vibratably mounted thereto a thin air impervious film form member of a thickness of between 0.00025 and 0.001 inch and which in the combination hereof is free to be vibrated by the effect of sound waves flowing through the exposed perforations of the face portion of the sound absorbing element.

References Cited in the file of this patent

UNITED STATES PATENTS

| | | |
|---|---|---|
| 2,028,272 | Burgess | Jan. 21, 1936 |
| 2,060,241 | Prudden | Nov. 10, 1936 |
| 2,142,463 | Upson | Jan. 3, 1939 |
| 2,240,326 | Burns | Apr. 29, 1941 |
| 2,308,869 | Eckardt | Jan. 19, 1943 |

FOREIGN PATENTS

| | | |
|---|---|---|
| 64,385 | France | June 8, 1955 |
| | (1st addition of No. 1,021,927) | |
| 768,826 | Great Britain | Feb. 20, 1957 |